(12) United States Patent
Pe'er et al.

(10) Patent No.: US 10,178,090 B2
(45) Date of Patent: Jan. 8, 2019

(54) SYSTEM AND METHODS FOR PROTECTING KEYS USING GARBLED CIRCUITS

(71) Applicants: Unbound Tech Ltd, Petach Tiqva (IL); Bar-Ilan University, Ramat-Gan (IL)

(72) Inventors: Guy Pe'er, Talme Yechiel (IL); Yehuda Lindell, Givat Shmuel (IL)

(73) Assignees: Bar-Ilan University, Ramat-Gan (IL); Unbound Tech, Ltd., Petach Tikva (IL)

( * ) Notice: Subject to any disclaimer, the term of this patent is extended or adjusted under 35 U.S.C. 154(b) by 0 days.

(21) Appl. No.: 15/545,883

(22) PCT Filed: Feb. 28, 2016

(86) PCT No.: PCT/IL2016/050227
§ 371 (c)(1),
(2) Date: Jul. 24, 2017

(87) PCT Pub. No.: WO2016/135738
PCT Pub. Date: Sep. 1, 2016

(65) Prior Publication Data
US 2018/0019868 A1    Jan. 18, 2018

Related U.S. Application Data

(60) Provisional application No. 62/121,528, filed on Feb. 27, 2015.

(51) Int. Cl.
*H04L 29/06* (2006.01)
*G06F 21/00* (2013.01)
(Continued)

(52) U.S. Cl.
CPC .......... *H04L 63/0838* (2013.01); *G06F 21/00* (2013.01); *G06F 21/31* (2013.01);
(Continued)

(58) Field of Classification Search
CPC ...... H04L 9/085; H04L 9/0819; H04L 9/0894
(Continued)

(56) References Cited

U.S. PATENT DOCUMENTS 9,509,665 B2* 11/2016 Kolesnikov ......... H04L 63/0428
2006/0117175 A1* 6/2006 Miura ................... G06F 21/445
713/155
(Continued)

OTHER PUBLICATIONS

Songhori et al. "TinyGarble: Highly Compressed and Scalable Sequential Garbled Circuits," 2015 IEEE Symposium on Security and Privacy, pp. 411-428.*
(Continued)

*Primary Examiner* — Roderick Tolentino
(74) *Attorney, Agent, or Firm* — McAdrews, Held & Malloy, Ltd.

(57) ABSTRACT

The subject matter discloses a computerized system, comprising a computerized device communicating with a third party server, that comprises a memory unit that stores a representation of a Boolean circuit and a processing unit for calculating a result of the Boolean circuit according to a string used as input for the Boolean circuit and calculating a first predefined function on the result of the Boolean circuit. The system also comprises a first auxiliary server communicating with the computerized device, the first auxiliary server comprises a processing unit for calculating a second predefined function on the result of the Boolean circuit received from the computerized device and a second auxiliary server communicating with the computerized device comprises a processing unit for comparing the result of the first predefined function and the result of the second predefined function.

20 Claims, 7 Drawing Sheets

(51) Int. Cl.
*G06F 21/31* (2013.01)
*G06F 21/62* (2013.01)
*G09C 1/00* (2006.01)
*H04L 9/08* (2006.01)
*H04L 9/14* (2006.01)
*H04L 9/32* (2006.01)

(52) U.S. Cl.
CPC ............... *G06F 21/62* (2013.01); *G09C 1/00* (2013.01); *H04L 9/085* (2013.01); *H04L 9/0819* (2013.01); *H04L 9/0894* (2013.01); *H04L 9/14* (2013.01); *H04L 9/3247* (2013.01); *H04L 9/3271* (2013.01); *H04L 63/0281* (2013.01); *H04L 63/06* (2013.01); *H04L 63/061* (2013.01); *H04L 63/062* (2013.01); *H04L 63/168* (2013.01); *H04L 2209/12* (2013.01); *H04L 2209/50* (2013.01); *H04L 2209/76* (2013.01)

(58) Field of Classification Search
USPC .................................................. 380/277–286
See application file for complete search history.

(56) References Cited

U.S. PATENT DOCUMENTS

| | | | | |
|---|---|---|---|---|
| 2007/0027717 A1* | 2/2007 | Karamchedu | .......... | G06Q 50/24 705/3 |
| 2011/0110525 A1* | 5/2011 | Gentry | .................. | H04L 9/0822 380/285 |
| 2012/0151206 A1* | 6/2012 | Paris | ..................... | H04L 9/3234 713/155 |
| 2014/0108435 A1* | 4/2014 | Kolesnikov | ............... | G06F 7/24 707/754 |
| 2014/0372769 A1* | 12/2014 | Kerschbaum | ........... | H04L 9/008 713/189 |
| 2015/0007258 A1* | 1/2015 | Patey | ........................ | H04L 9/00 726/1 |
| 2015/0161398 A1* | 6/2015 | De Cristofaro | ......... | G06F 21/60 726/26 |
| 2016/0050070 A1* | 2/2016 | Bohli | .................... | H04L 9/0819 713/168 |

OTHER PUBLICATIONS

Lazzeretti et al., "Division Between Encrypted Integers by Means of Garbled Circuits," 2011 IEEE International Workshop on Information Forensics and Security Year: 2011.*

"Sharemind: programmable secure computations with practical applications"; PhD Thesis; 2013; Retrieved from the Internet: <URL: http://dspace.ut.ee/bitstream/handle/10062/29041/bogdanov_dan_2.pdf?sequence=5&isAllowed=y>BOGDANOV, Dan Feb. 28, 2013.

"Whitewash: Outsourcing garbled circuit generation for mobile devices", Proceedings of the 30th Annual Computer Security Applications Conference; p. 266-275; ACM 2014; Retrieved from the Internet: <URL: https://smartech.gatech.edu/bitstream/handle/1853/50924/GT-CS-14-02.pdf>Carter, Henry; Lever, Charles; Traynor, Patrick Dec. 14, 2016.

"Secure outsourced garbled circuit evaluation for mobile devices"; 22nd USENIX Security Symposium (USENIX Security 13); p. 289-304; 2013; Retrieved from the Internet: <URL: http://www.cise.ufl.edu/~traynor/papers/carter-sec13.pdf>Carter, Henry, et al. Aug. 16, 2013.

International Search Report and Written Opinion corresponding to International Patent Application No. PCT/IL2016/050227, dated Jun. 21, 2016.

* cited by examiner

SYSTEM AND METHODS FOR PROTECTING KEYS USING GARBLED CIRCUITS

FIELD OF THE INVENTION

The invention generally relates to the field of data security, more specifically to using garbled circuits when protecting data.

BACKGROUND OF THE INVENTION

A garbled circuit is a method Proposed by Andy Yao in 1986 for secure multiparty computation. This is a two party protocol. This protocol is only secure against an adversary from the Honest-but-curious adversary model. In Yao's protocol, one party (called the circuit creator) takes a binary circuit C, and produces a so-called Garbled binary Circuit GC, which is a form of encrypted representation of the circuit.

In particular every wire in the circuit is given two garbled labels, which are each a cryptographic key. One garbled label corresponds to the zero signal on the wire, and the other corresponds to the output signal. Each gate in the circuit is replaced by an encryption table, called a garbled gate. The table is such that knowledge of garbled labels corresponding to the input wire signals, allows one to compute the corresponding label of the output wire signal. The set of all such garbled gates is called the Garbled binary Circuit GC.

The GC is sent to the second party along with the garbled labels corresponding to the inputs of the first party, and a table mapping garbled output labels to actual output values. The second party (called the circuit evaluator) obtains the garbled labels according to its own inputs by performing an Oblivious Transfer (OT) protocol with the circuit creator. The evaluating party can now evaluate the garbled circuit, and hence obtain the output of the binary circuit on the input provided by the two parties (using the table of garbled output labels). Since the inputs are only provided as garbled labels, this is done without the evaluating party learning the inputs of the first party. Standard modifications, known in the art, allow both parties to obtain different outputs (i.e. compute different functions on the joint inputs).

As described above we only achieve a passively secure protocol; i.e. the protocol is not secure if one of the parties deliberately deviates from the protocol. Passive security is a very weak form of security. Ideally one requires a protocol which is actively secure. An actively secure protocol is still secure (in the sense of input privacy and output correctness) even if one of the participating parties deviates from the protocol in an arbitrary manner.

To make the Yao protocol actively secure one usually needs a lot more complex operations. The standard method in the literature to achieve active security is to use a form of cut-and-choose. This is explained in various papers such as Lindell and Pinkas 2015. However, using cut-and-choose is very expensive in terms of the additional computational costs. Another method to achieve active security is to increase the number of computing parties from two to three; we can achieve active security at very little extra cost if we assume only one of the three servers is corrupted at any one time. A variant for producing such a protocol has been given by Mohassel et al. However, it is not suited for where one party is a bandwidth constrained mobile device, due to the high bandwidth constrains imposed on the two parties.

SUMMARY OF THE INVENTION

The subject of the present invention is to use garbled circuits to obtain an actively secure method to evaluate an arbitrary function F expressed as a binary circuit, where the function has two inputs, $x1$ and $x2$, and produces an output c. One input, $x1$, is held on a mobile device and the other input is held on server S1. The invention utilizes second server S2 to enable the mobile device to obtain $c=F(x1,x2)$ without any party learning any other data. Thus we present a three party variant of Yao's system, in which one party is a mobile device. We call this procedure the "Main Protocol" in what follows.

The present invention also describes an application of this idea consider the use of a keyed PresudoRandom Function (PRF) function used in a many authentication mechanisms. Authentication mechanisms often involve the application of a keyed PRF to some challenge string s. In particular the authenticating party computes the value $c=PRF(k,s)$ for some challenge string known to both the authenticating party and the verifying party (this could be a time value, counter, or random nonce). The key k is shared between both parties, which allows the verifying party to also compute c and compare it to the value produced by the authenticating party. A problem with this nave authentication mechanism is that the key k needs to be held by the authenticating party, which is often in some untrusted mobile device. The present invention allows the mobile device to engage in an actively secure computation (using garbled circuits) with two helper servers. The key k being split between the mobile device and one of the helper servers. In one embodiment of the invention the helper servers are owned by the employer of the person holding the mobile device, or their bank. The invention provides increased security as the loosing of the mobile device does not compromise a security loss, as the mobile device no longer holds any master secret data.

Another application could be to validate some biometric data, $x1$, collected by the mobile device with some other user specific data, $x2$, held by S1 and then compare this against some entry in a third party database Another application would enable the mobile device to produce a digital signature on some data, where the private key of the signing algorithm is split between the mobile device and the server S1. Again, the only thing which changes in our description below of the authentication example is the precise nature of the function F being computed, and what the third party database/server does with the result. Other applications of the basic invention are obvious to those skilled in the art.

It is an object of the present invention to disclose a computerized system, comprising:

a computerized device communicating with a third party server, the computerized device comprises a memory unit that stores a representation of a Boolean circuit and a processing unit for calculating a result of the Boolean circuit according to a string used as input for the Boolean circuit and calculating a first predefined function on the result of the Boolean circuit; a first auxiliary server communicating with the computerized device, the first auxiliary server comprises a processing unit for calculating a second predefined function on the result of the Boolean circuit received from the computerized device; and a second auxiliary server communicating with the computerized device comprises a processing unit for comparing the result of the first predefined function and the result of the second predefined function.

In some cases, the computerized device comprises a random string generator for generating a pseudo random string used as input of the Boolean circuit. In some cases, the predefined function is a hash function. In some cases, the computerized device comprises an encryption unit for encrypting the string using an encryption key and a communication interface for transmitting the encrypted string to the second auxiliary server. In some cases, the computerized device comprises a multi-party computation module for splitting the encryption key such that a first share of the encryption key is stored at the computerized device and a second share of the encryption key is stored at the first auxiliary server. In some cases, the second auxiliary server comprises a decryption unit for decrypting the encrypted string received from the computerized device using the first share of the encryption key received from the computerized device and the second share of the encryption key received from the first auxiliary server. In some cases, the processing unit of the second auxiliary server is also configured to calculate the Boolean circuit using the decrypted string. In some cases, the processing unit of the second auxiliary server is also configured to calculating a third predefined function on the result of the Boolean circuit calculated at the second auxiliary server. In some cases, the processing unit of the second auxiliary server is also configured to compare the result of the third predefined function with the result of the first predefined function.

It is another object of the present invention to disclose a computerized method of performing an authentication process, comprising receiving a request from a computerized device to communicate with an application server, computing a function by the computerized device and two auxiliary servers, the input of said function is a string used to generate a garbled circuit, transmitting the output of the function to the application server to verify the eligibility of the computerized device. In some cases, the function is a pseudo-random function. In some cases, the function comprises evaluating a garbled circuit. In some cases, the method further comprises the computerized device and the application server agreeing on a message and the application server using the message to calculate the function.

It is another object of the present invention to disclose a method of computing a function, comprising generating a random string used as a seed of a garbled circuit; transmitting two different byproducts of the garbled circuit from a computerized device to two separate auxiliary servers; the first auxiliary server performs a computation using the byproduct received from the computerized device to provide a byproduct of the other auxiliary server and sends the output of the computation to the other auxiliary server; the other auxiliary server compares the byproduct received from the computerized device and the byproduct received from the first auxiliary server.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF THE INVENTION

Figure 1:
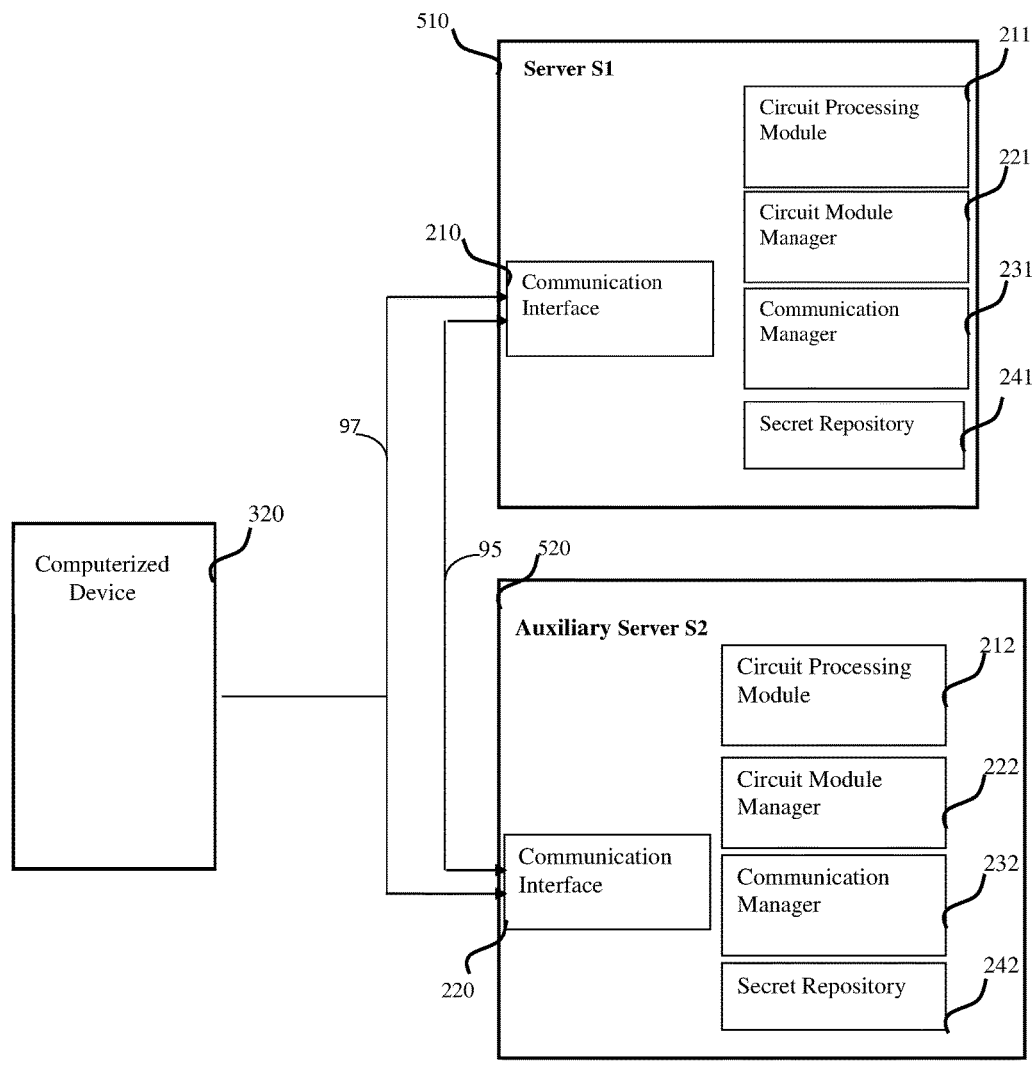
Referring to FIG. 1, is a functional diagram disclosing a system designed for a mobile device and a server to securely compute a function of their joint input, using the an auxiliary server to provide an actively secure computation.

The subject matter discloses a computerized system and method for authenticating a computerized device communicating with a third party, such as an application server. The computerized system comprises at least two auxiliary servers communicating with the computerized device and components residing at the two auxiliary servers configured to perform the method described in details below. The method comprises a multi-party computation (MPC) performed between the computerized device and one of the auxiliary servers, using a random string to solve a Boolean circuit represented by a software model, sending information, sometimes encrypted, between the computerized device and the auxiliary servers, and verifying the authenticity of the computerized device by one of the auxiliary servers. Referring to FIG. 1, that discloses a system designed to enable a computerized mobile device and a server to securely compute an arbitrary function of their joint input, using an auxiliary second server to enable the computation to be performed in an actively secure manner, according to exemplary embodiments of the present invention. The system of the disclosed subject matter contains a computerized device 320, a server 510 and an auxiliary server 520. The computerized device 320 and the two servers 510, 520 calculate the output of a Boolean circuit. The Boolean circuit may be a set of interconnected Boolean circuits. The Boolean circuit may be implemented as Yao's garbled circuits or any other equivalent desired by a person skilled in the art.

In some exemplary cases, the server 510 comprises a communication interface 241, configured to manage and implement communication to and from the server 510. The communication interface 241 enables communication with the second auxiliary server 520 via communication process 95 and with the computerized device 320 via communication process 97. Similarly, the second auxiliary server 520 comprises communication interface 242 to perform communication functionalities similar to those of communication interface 241.

The server 510 may also comprise a circuit processing module 211 utilized to generate a garbled circuit representation for a given string, for example a random string received from the computerized device 320. The given string may be used as a seed to generate the Boolean circuit representation. In some other cases, the circuit processing module 211 may also be used to calculate a hash value of a secret received by one of the auxiliary servers 510, 520 of the system or by the computerized device 320. Similarly, the second auxiliary server 520 comprises a circuit processing module 212 to generate a Boolean circuits in a similar manner performed by the circuit processing module 211. The circuit processing module 211 also manages other calculation processes associated with the Boolean circuit such as calculation of the Boolean circuit result or hash the value of the Boolean circuit result. Other functions may be applied on the result of the Boolean circuit, for example reversible or irreversible functions, as long as the functions are predefined.

The server 510 also comprises a circuit module manager 221 to associate the Boolean circuit representation, or any other string, received at the server, with the computerized device that sent the string. For example, when a random string for generating the Boolean circuit representation is sent from the computerized device 320 to the server 510, the circuit module manager 221 identifies the string, associates the string with the computerized device that sent the string and stores it. Similarly, the second auxiliary server 520 comprises a circuit module manager 222 operating in a similar manner to the identification process and performs the same actions performed by the circuit module manager 221.

The server 510 also comprises a Communication Manager 231 to save and store addresses of the identified entities that communicate with the server 510 such as computerized devices or/and auxiliary servers, and to control the communications with them. For example, when a certain string or data needs to be transmitted to a specific server or to any computerized device, the Communication Manager 231 associates the data needed to be transmitted with the address of the target server or computerized device and transmits the string or data to the target via Communication Interface 210 that performs the transmissions. Similarly, the second auxiliary server 520 comprises a Communication Interface 232 performing communication management in a similar manner to those performed by the Communication Manager 231.

The server 510 also comprises a Secret Repository 241 configured to store secrets received by the server, for example in cases any calculation results are sent by the Computerized Device 320 as part of the computation process. The server 510 stores the received calculation result at the Secret Repository 241. Similarly, the second auxiliary server 520 comprises a Secret Repository 242 that saves secrete in a similar manner to the secret saving actions performed by the Communication Manager 241.

Figure 2:
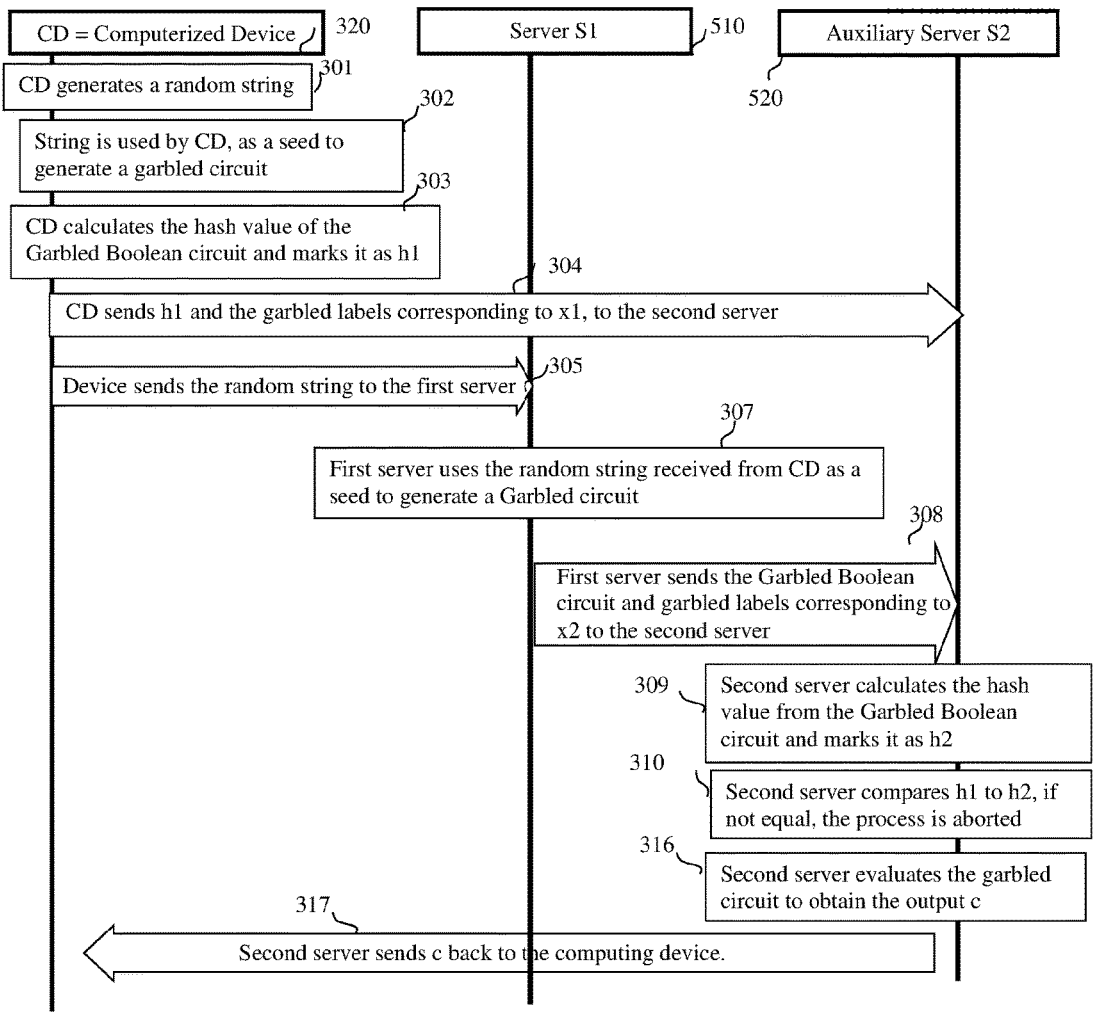
Referring to FIG. 2, demonstrates a method for securely computing the result of a computation on two pieces of data, one held by the mobile device and one by a server. The method utilizes a second (auxiliary) server to compute the desired result, which is returned to the mobile device.

Referring to FIG. 2, demonstrates a method for securely computing an arbitrary function on data held by the computerized device and a server, according to exemplary embodiments of the present invention. For simplicity and clarity purposes the process described in FIG. 2 shall be referred hereafter to "Main Protocol". The computerized device may be a mobile device assumed to be constrained in terms of its communication abilities and computation resources, such as bandwidth. The method securely computes a function $F(x_1, x_2)$, where $x_1$ is data held by the computerized device and $x_2$ is data held by the server. The method requires very little communication costs from the point of view of the computerized device.

Step 301 discloses initiating the computation process of Computerized Device 430 by generating a random string at the Computerized Device 430. The random string is used as a seed to generate the garbled circuit, and hence will be a pre-defined length to avoid exhaustive search, for example 128 bits.

Step 302 discloses generating of the Boolean circuit representation, for example garbled circuits, utilizing the random string generated on step 301 as the seed.

Step 303 discloses calculating the hash value using the Garbled Boolean circuit generated on step 302. The hash value is denoted as h1 for simplicity and clarity of the disclosure. The hash function used by the computerized device may be the same hash function later performed by at least one of the two auxiliary servers. Examples of hash functions are SHA-1, SHA-2 and SHA-3.

Step 304 discloses transmitting the hash value of the Garbled Boolean circuit marked as h1, and the garbled labels corresponding to input data $x_1$ to the auxiliary server 520.

Step 305 discloses transmitting the random string generated in step 301 from the computerized device 430 to the first server 510. Then, in step 307, the first server 510 uses the random string received from the computerized device 430 as a seed to generate a Garbled Boolean circuit. Then, in step 308 the first server 510 sends the Garbled Boolean circuit and the garbled label corresponding to $x_2$ to the auxiliary server 520.

Step 308 discloses the second auxiliary server 540 calculating the hash value from the Garbled Boolean circuit received from the first auxiliary server 530. The hash value calculated by the second auxiliary server 540 is denoted as h2. Then, in step 309, the second auxiliary server 540 compares h1 received from computerized device 430 to h2 calculated at step 308 and if the strings are not equal, the process is aborted. If the strings are equal, the auxiliary server 520 evaluates the garbled circuit as shown in step 316 to obtain the result c. The value c is the result of computation of the garbled circuit performed by the auxiliary server 520. Then, in step 317, the computation result c is returned to the computing device 320.

Application of Main Protocol to Authentication Application

Figure 3:
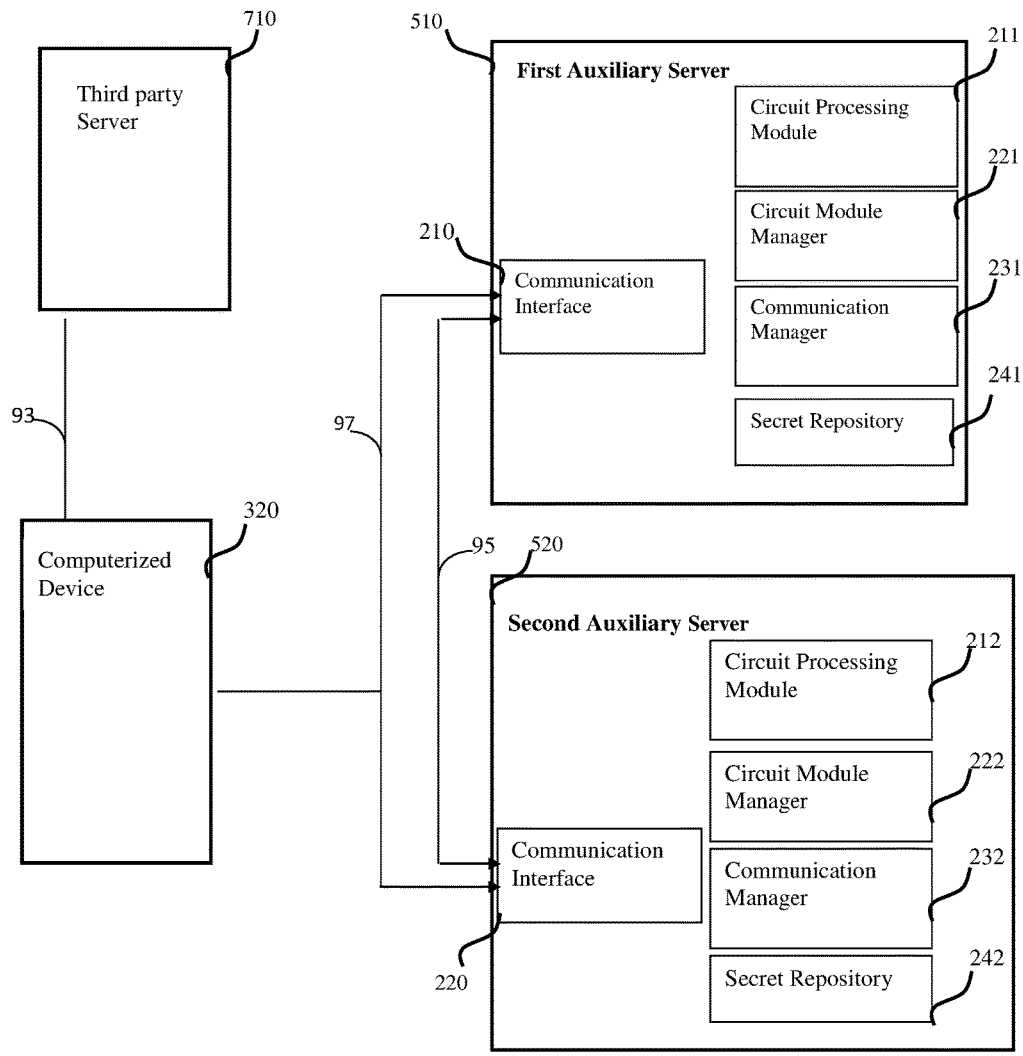
Referring to FIG. 3, is a functional diagram discloses a system designed to prove a computerized device identity to a third party server via an authentication process conducted by at least two auxiliary servers, according to exemplary embodiments of the present invention Referring to FIG. 4, demonstrates a method of an authentication process between a computerized device and a third party server by utilizing two auxiliary servers to prove the computerized device's eligibility to connect, according to exemplary embodiments of the present invention.

Referring to FIG. 3 that discloses a system designed to enable a computerized mobile device to prove its identity to a third party server via an authentication process conducted by at least two auxiliary servers communicating with the computerized device, according to exemplary embodiments of the present invention. The third party server is defined as a computerized module configured to provide information, service or specific results to one or more clients, users and subscribers. The system of the disclosed subject matter contains a computerized device 320 that communicates with the third party server 710, a first auxiliary server 510 and a second auxiliary server 520. The authentication process is assumed to be the application of a keyed Pseudo-Random Function (PRF) to a shared string. This is a common authentication mechanism. Two advantages arise from the use of the main protocol above to this situation:

No alterations in terms of the operation of the third party server 710 are needed compared to existing embodiments.

The secret key k is no longer needed to be held on the mobile device 320, since it is split between the mobile device 320 and the first auxiliary server S1 510.

In some exemplary cases, the first auxiliary server 510 comprises a communication interface 241, configured to manage and implement communication to and from the first auxiliary server 510. The communication interface 241 enables communication with the second auxiliary server 520 via communication process 95 and with the computerized device 320 via communication process 97. Similarly, the second auxiliary server 520 comprises communication interface 242 to perform communication functionalities similar to those of communication interface 241.

Figure 4:
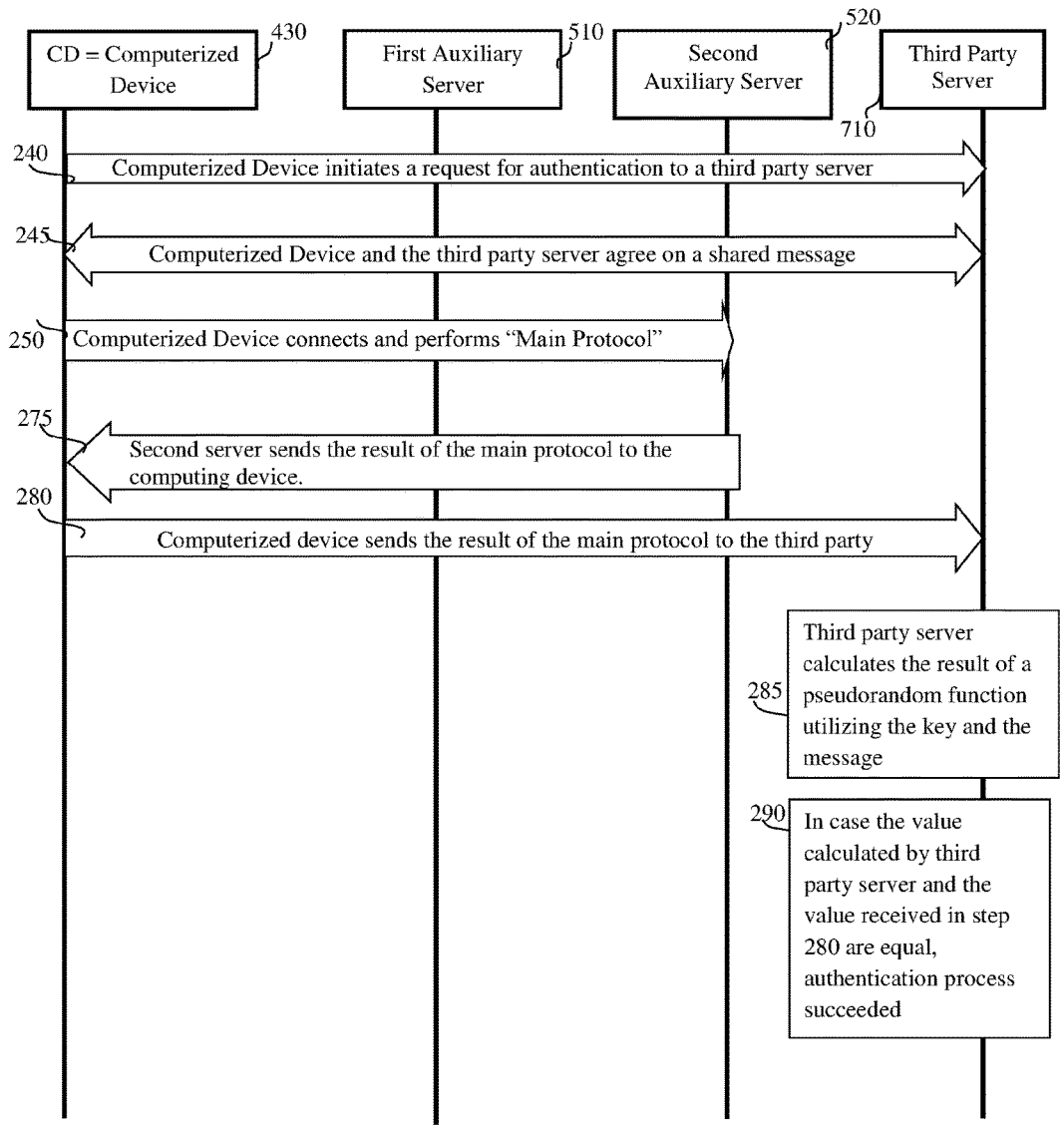

Referring to FIG. 4, demonstrates a method of an authentication process between a computerized device and a third party server by utilizing two auxiliary servers to prove the computerized device's eligibility to connect, according to exemplary embodiments of the present invention. In this process, the computerized device 320, the auxiliary server 510 and the third party server 710 share an encryption key in the following fashion: The computerized device 320, holds a first share of the cryptographic key, third party server 710 holds the whole encryption key and the auxiliary server 510 holds another share of the encryption key such that the key share held by the auxiliary server 510 and the key share held by the computerized device 320 can be used to execute a whole key similar to the key stored at the third party server 710. For the purposes of example we use k=k1 XOR k2 in what follows, but other splitting techniques are obvious to those skilled in the art.

The authentication method for the third party server comprises the following steps:

Step 240 discloses an initiation of the process by the computerized device 320 requesting the third party server 710 to start the authentication process. This is assumed to be a standard login request, or HTTP request, as specified in whatever legacy authentication service the present invention is to be layered on top of.

Then, in step 245 a process takes place between the computerized device 320 and the third party server 710 to agree on a shared message s. Agreement on the shared message s is assumed to be a standard process, as specified by whatever legacy authentication service the present invention is to be used with. The message s could contain random data produced by the mobile device, and/or random data produced by the third party server, and/or could involve a unique text, a timestamp, or any other information the two entities agree to utilize as a message.

Then in step 250 the computerized device 320 sends the shared message s that was agreed upon with third party server 710, to the auxiliary server 510.

In step 250 the mobile device 320, the first auxiliary server S1, and the second auxiliary server S2 engage in the Main Protocol described above to securely compute the output of the function $$c=F\_s(k1,k2)=PRF(k1 \mathrm{XOR} k2,s).$$

As a result of this protocol the mobile device obtains the value c.

Then, in step 280, the computerized device 320 sends the value c obtained from executing the Main Protocol to the third party server 710.

Step 285 discloses a calculation process performed by third party server 710. Third party server calculates the c' value with a pseudorandom function utilizing the key and the message agreed with from the computerized device 320 as disclosed in step 245.

$$c'=\mathrm{PRF}(k,s)$$

Then, in step 290, the third party server compares the c' value of the pseudorandom function calculated in step 285 and the one received in step 280 from the computerized device 320 and if the results are equal authentication process has succeeded and the computerized device 320 is eligible to connect to the third party sever 710.

Figure 5:
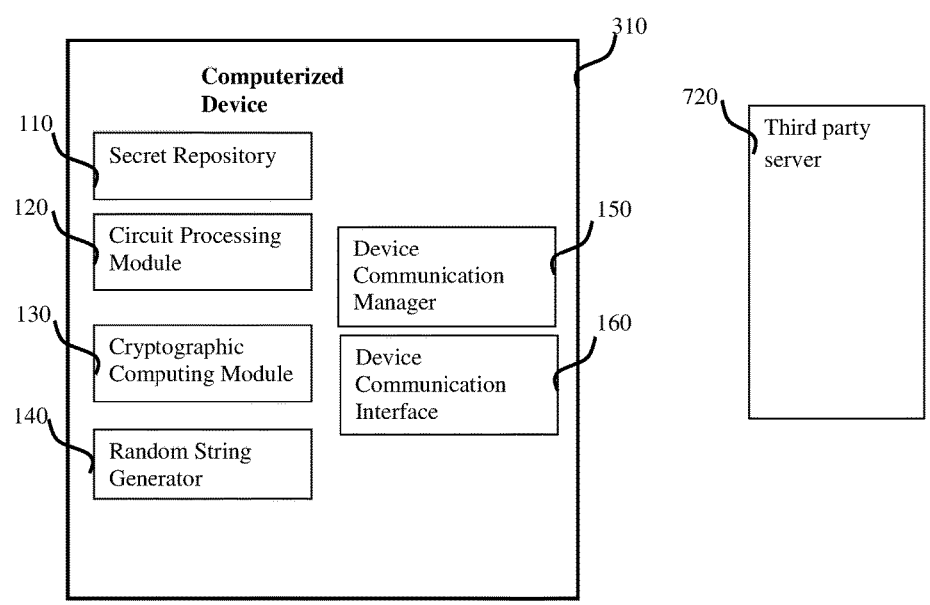
Referring to FIG. 5, demonstrates a computerized device that communicates with a third party server, according to exemplary embodiments of the present invention.

Referring to FIG. 5, demonstrates a computerized device that communicates with a third party server, according to exemplary embodiments of the present invention. The computerized device may communicate with the third party server for cases such as purchasing on the internet, approving transactions, signing on documents and the like. The Computerized Device 310 contains a circuit processing module 120 that calculates a result of Boolean circuits that may implement Yao's garbled circuits or any other equivalent method. The circuit processing module 120 calculates the Boolean circuit according to an input of a random string generated by the random string generator 140. For example, in case a result of a Boolean circuit needs to be calculated as a part of an authentication process controlled by this exemplary system, the circuit processing module 120 receives an input string, calculates the result and transmits it to the corresponded component in the authentication process disclosed above.

The Computerized Device 310 also contains a cryptographic computing module 130 utilized for multiple encryption operations the system may perform, for example calculating hash values or encrypting secrets. The Computerized Device 310 also contains a secret repository 110 to store the secrets or any data that is considered sensitive or confidential, for example an input key generated by the random string generator 140. The Computerized Device 310 also contains a server communication manager 150 that associates the data needed to be transmitted to the auxiliary servers or third party server 720, with the address of the target auxiliary servers or a third party server 720. Thus, in multiple cases when a certain data needs to be transmitted to a specific server, for example first auxiliary server, and a different data needs to be sent to second auxiliary server, the communication manager 150 sends the relevant data to the right server.

The Computerized Device 310 also contain device communication interface 160 that communicates with other components in the system, for example a third party server 720. The Computerized Device 310 also contains Random string generator 140 to produce a random string that can be used as the input for calculating a Boolean circuit result, for example, in a case a Boolean circuit needs to be calculated by the circuit processing device 120, the Random string generator 140 generates a string and transmits it to the circuit processing device 120 to be used as the input seed of this calculation.

Figure 6:
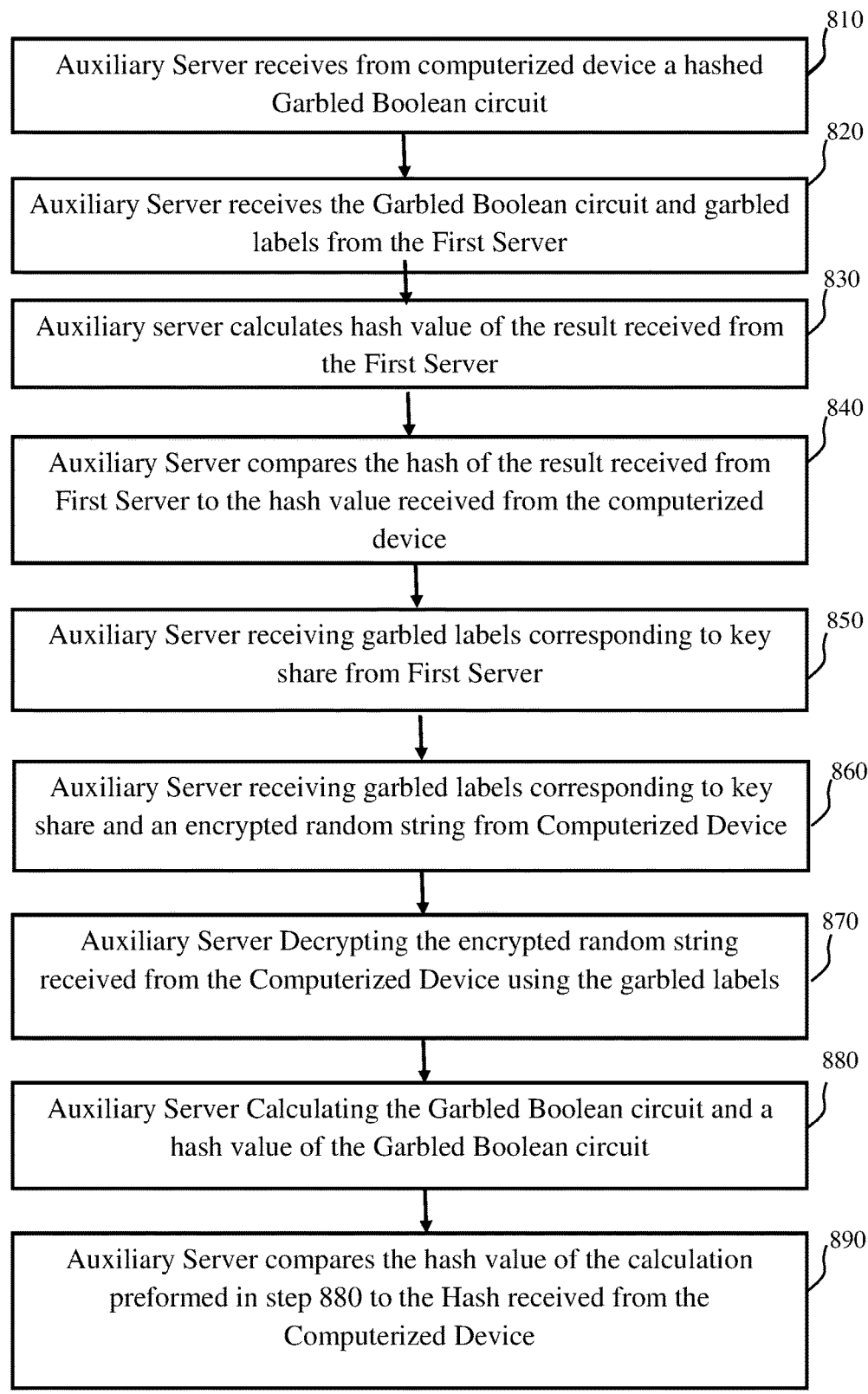
Referring to FIG. 6, demonstrates a method of comparing a Boolean circuit calculation results, by a second auxiliary server, in order to prove the identity of a computerized device, according to exemplary embodiments of the present invention.

Referring to FIG. 6, demonstrates a method of enabling a computerized device to prove its identity to a third party server, according to exemplary embodiments of the present invention. The method disclosed in FIG. 6 is performed by the auxiliary server. The method initiates in step 810, in which the auxiliary server receives a hashed value of a Garbled Boolean circuit calculation, performed by the computerized device. The computerized device calculates the Garbled Boolean circuit according to a random string generated at the computerized device. Then, in step 820, the auxiliary server receives a hash value from the First Server. The hash value is a result of a hash function applied on the calculation of a Boolean circuit calculated by the First Server. Then, in step 830, the Auxiliary server calculates a hash value from the result of the Garbled Boolean circuit calculation received from the First Server in step 820. Then, in step 840, the Second Auxiliary Server compares the hash value of the result of the Boolean circuit calculation received from First Auxiliary Server to the hashed result received from the computerized device. Then, in case the comparison in step 840 shows that the two hashed strings, the one received from the computerized device and the hash preformed on the Boolean circuited results received from First Auxiliary Server are identical, step 850 is performed, in which the Auxiliary Server receives garbled labels corresponding to key share from First Server. Then, in step 860, the Auxiliary Server receives a garbled labels corresponding to key share and an encrypted random string from the Computerized Device. Then, in step 870, the Second Auxiliary Server decrypts the encrypted random string received from the Computerized Device using the key shares received from the Computerized Device and from the First Auxiliary Server. Then, in step 880, the Second Auxiliary Server calculates the Boolean circuit using the decrypted random string that was decrypted in step 870. In step 890 the Second Auxiliary Server compares the hash calculation result, preformed in step 880, to the hash received from First Auxiliary Server and the hash received from the Computerized Device.

Figure 7:
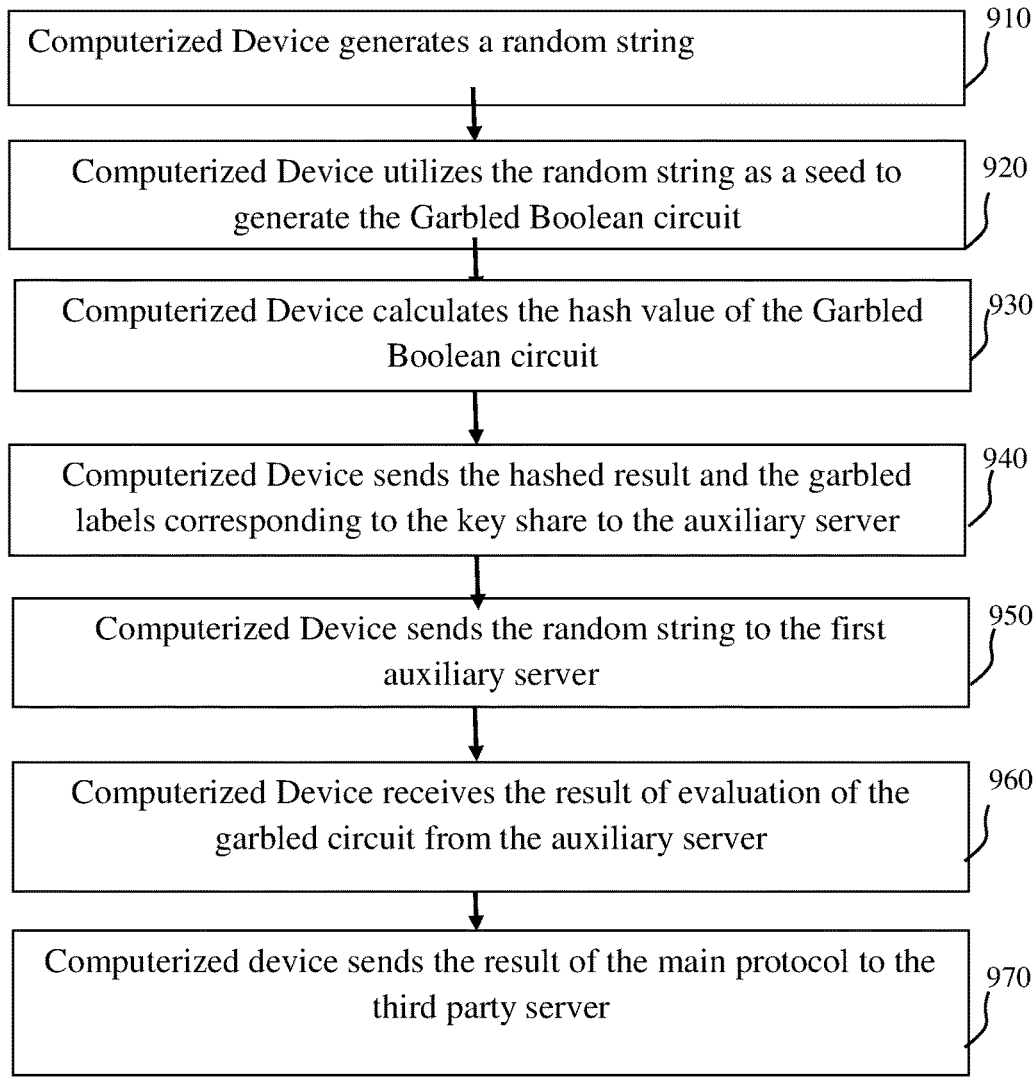
Referring to FIG. 7, demonstrates a method of exchanging a Boolean circuit calculation results, between a computerized device and two auxiliary servers, in order to prove the identity of the computerized device and the validity of its identification, according to exemplary embodiments of the present invention.

Referring to FIG. 7, which demonstrates a method of exchanging of a Garbled Boolean circuit, between a computerized device and two auxiliary servers, in order to prove the identity of the computerized device and the validity of its identification, according to exemplary embodiments of the present invention. The method disclosed in FIG. 7 is performed by the Computerized Device. The method comprises the following steps: In step 910, a Computerized Device generates a random string by a random string generator module controlled by or located at the Computerized Device. Step 920 discloses the Computerized Device generating a Garbled Boolean circuit by utilizing the random string generated in step 910 as a seed. Then, in step 930, the computerized device calculates a hash value of the garbled Boolean circuit using an input string. The garbled Boolean circuit is represented by software, hardware or firmware in the Computerized Device.

Step 940 discloses the Computerized Device sending the hashed result and the garbled labels corresponding to the key share to the auxiliary server. Then, in step 950, the Computerized Device sends the random string generated in step 910 to the first server. Step 960 discloses the Computerized Device receives the result of evaluation of the garbled circuit from the auxiliary server. Then, in step 970, the Computerized Device sends the result of the main protocol to the third party server.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A system comprising a computerized device configured to communicate with a third-party server and to receive a computation result C calculated by a first auxiliary server and a second auxiliary server, wherein the computerized device stores first input data and the first auxiliary server stores second input data, the computerized device comprising:

a communication interface, a memory unit, and a processing unit configured to:
  generate a random string by a string generator;
  generate a first garbled circuit by utilizing the random string as a seed;
  generate first garbled labels of the first garbled circuit by the computerized device, wherein the first garbled labels correspond to a first input data of the computerized device;
  compute a first hash value from the first garbled circuit;
  send the random string to the first auxiliary server;
  send the first hash value to the second auxiliary server;
  send the first garbled labels to the second auxiliary server; and
  receive a computation result C from the second auxiliary server, wherein the computation result C confirms that the computerized device is entitled to connect to the third-party server, wherein:
  the first auxiliary server generates a second garbled circuit by utilizing the random string received from the computerized device as a seed, generates second garbled labels of the second garbled circuit by the computerized device, wherein the second garbled labels correspond to the second input data of the first auxiliary server, sends the second garbled circuit to the second auxiliary server, and sends the second garbled labels to the second auxiliary server;
  the second auxiliary server calculates a second hash value from the second garbled circuit received from the first auxiliary server;
  the second auxiliary server utilizes a computerized comparison process between the first hash value and the second hash value;
  the second auxiliary server calculates the computation result C by using the first garbled labels, the second garbled labels, and the first garbled circuit, in case that the computerized comparison process ended successfully; and
  the second auxiliary server sends the computation result C to the computerized device.

2. The system of claim 1, wherein the computerized comparison process is designed to detect if the first hash value is equal to the second hash value.

3. The system of claim 1, wherein calculate the computation result C is configured to be performed by evaluating an arbitrary function expressed as a binary circuit.

4. The system of claim 3, wherein the arbitrary function expressed as a binary circuit is designed to utilize the first input data and the second input data for calculating the output C.

5. The system of claim 1, wherein the first input data held by the computerized device is a key share of a whole cryptographic key, and the second data input held by the first auxiliary server is another key share of a whole cryptographic key.

6. The system of claim 5, wherein the key share held by the computerized device and the key share held by the first auxiliary server are used to execute a whole cryptographic key similar to the cryptographic key stored at the third-party server.

7. The system of claim 5, wherein the key share held by the computerized device and the key share held by the first auxiliary server are obtained via a multiple-party computation.

8. The system of claim 1, wherein the computerized device is further configured to send the computation result C to the third-party server.

9. The method of claim 1, wherein the second auxiliary server is configured to receive a random string, wherein the random string is encrypted by the first input data held by the computerized device and the second input held by the first auxiliary server.

10. The system of claim 9, wherein the second auxiliary server is configured to decrypt the encrypted random string received from the computerized device with the computation result as the decryption key.

11. A method operable by a computerized configured to communicate with a third-party server, and to receive a computation result C calculated by a first auxiliary server and a second auxiliary server, wherein the computerized device stores first input data and the first auxiliary server stores second input data, wherein the method comprising:
generating a random string by a string generator;
generating a first garbled circuit by utilizing the random string as a seed;
generating first garbled labels of the first garbled circuit by the computerized device, wherein the first garbled labels correspond to a first input data of the computerized device;
computing a first hash value from the first garbled circuit;
sending the random string to the first auxiliary server;
sending the first hash value to the second auxiliary server;
sending the first garbled labels to the second auxiliary server, and;
receiving a computation result C from the second auxiliary that confirms that the computerized device is entitled to connect to the third-party server, wherein:
the first auxiliary server generates a second garbled circuit by utilizing the random string received from the computerized device as a seed, generating second garbled labels of the second garbled circuit by the computerized device, wherein the second garbled labels correspond to the second input data of the first auxiliary server and sending the second garbled to the second auxiliary server, and sending the second garbled labels to the second auxiliary server;
the second auxiliary calculates a second hash value from the second garbled circuit received from the first auxiliary server;
the second auxiliary server utilizes a computerized comparison process between the first hash value and the second hash value;
the second auxiliary server calculates the computation result C by using the first garbled labels, the second garbled labels, and the first garbled circuit, in case that the computerized comparison process ended successfully; and
the second auxiliary server sends the computation result C to the computerized device.

12. The method of claim 11, wherein the first hash value is calculated from the first garbled circuit.

13. The method of claim 11, wherein calculating the computation result C is performed by evaluating an arbitrary function expressed as a binary circuit.

14. The method of claim 13, wherein the arbitrary function expressed as a binary circuit is designed to utilize the first input data and the second input for calculating the output C.

15. The method of claim 11, wherein the second input data held by the first auxiliary server is a key share of a whole cryptographic key, and the second input data held by the computerized device is another key share of a whole cryptographic key, and the third-party server stores a whole cryptographic key.

16. The method of claim 15, wherein the key share held by the computerized device and the key share held by the first auxiliary server are used to execute a whole cryptographic key similar to the cryptographic key stored at the third-party server.

17. The method of claim 15, wherein the third-party server stores the whole encryption key.

18. The method of claim 11, wherein the computerized device further sends a random string to the second auxiliary server, wherein the random string is encrypted by the first input data held by the computerized device.

19. The method of claim 18, wherein the second auxiliary server is decrypting the encrypted random string received from the computerized device with the first input data.

20. The method of claim 18, wherein the first input data is obtained by the second auxiliary server via the first garbled labels received from the computerized device.

* * * * *